Dec. 2, 1958   S. A. MINERA   2,862,326
FISHING KITE
Filed June 24, 1957   2 Sheets-Sheet 1
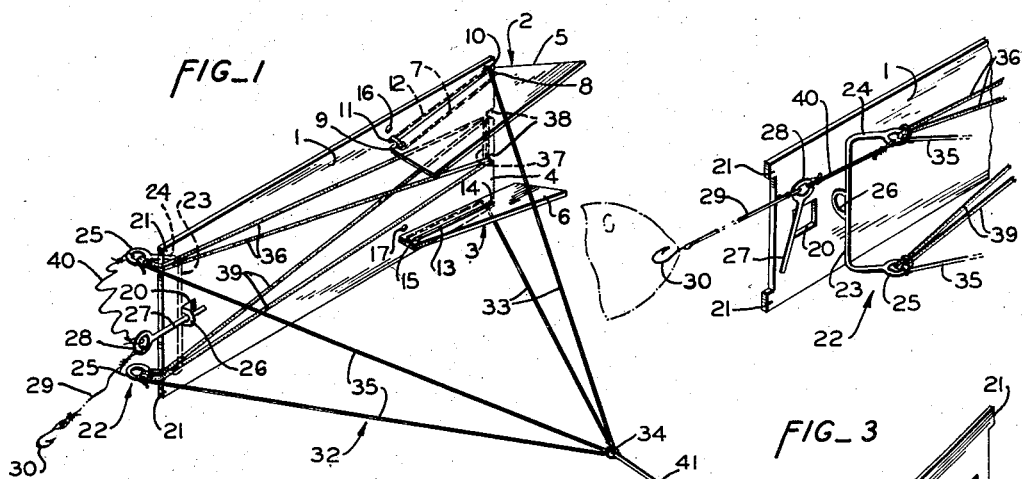
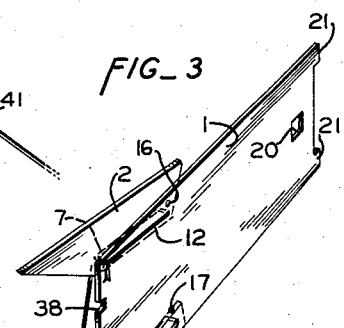
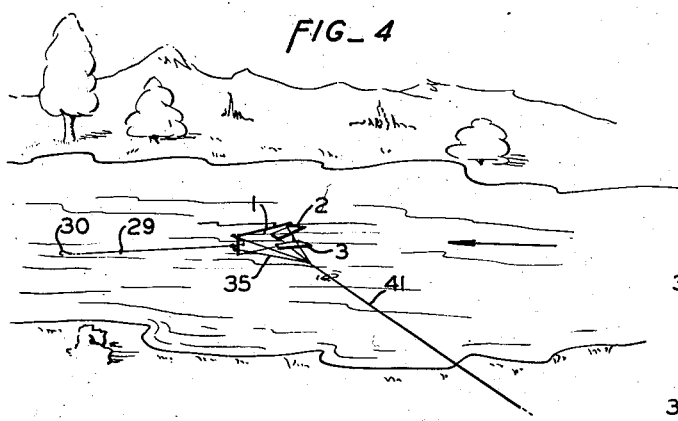
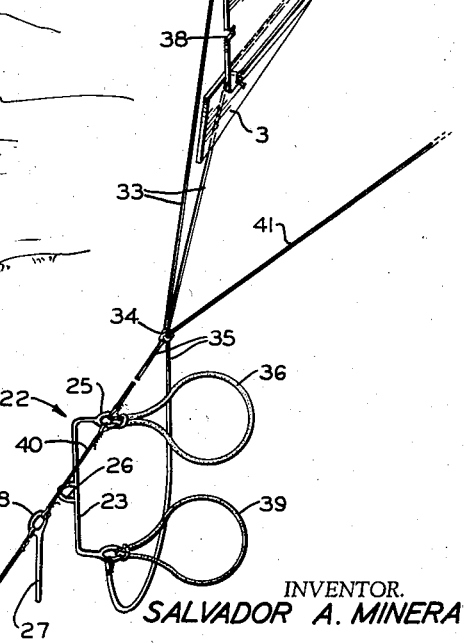
INVENTOR.
SALVADOR A. MINERA
BY
Boylen, Mohler & Wood
ATTORNEYS Dec. 2, 1958  S. A. MINERA  2,862,326
FISHING KITE
Filed June 24, 1957  2 Sheets-Sheet 2
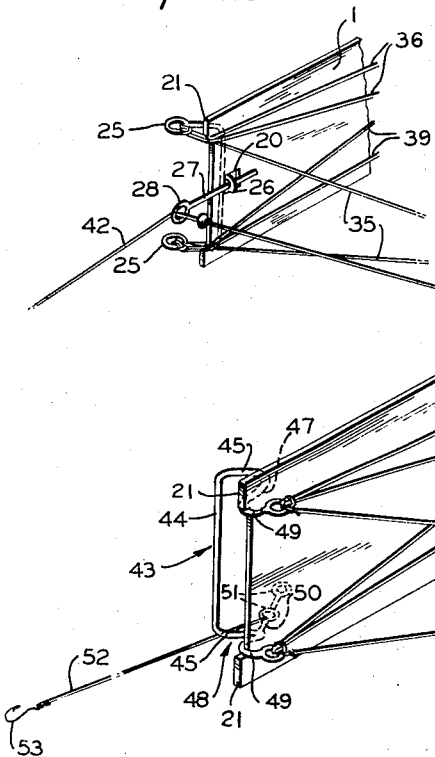
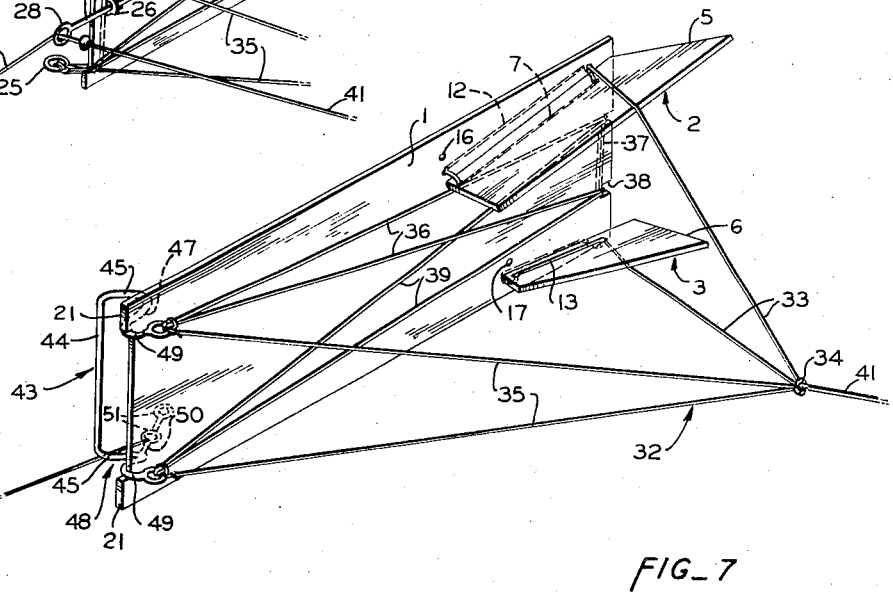
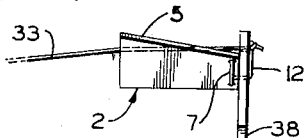
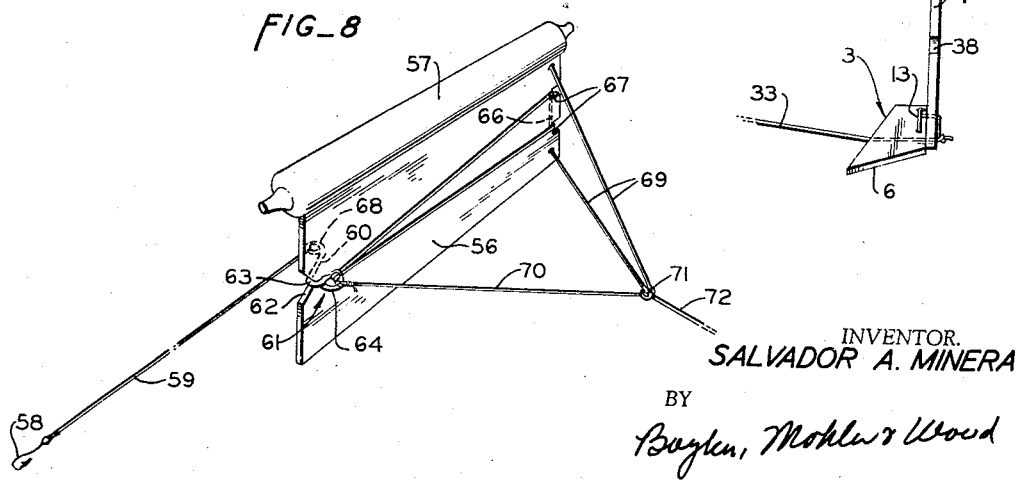
INVENTOR.
SALVADOR A. MINERA
BY
ATTORNEYS

United States Patent Office 2,862,326
Patented Dec. 2, 1958

2,862,326
FISHING KITE

Salvador A. Minera, San Francisco, Calif.

Application June 24, 1957, Serial No. 667,624

8 Claims. (Cl. 43—43.13)

This invention relates to a fishing kite, and has for one of its objects the provision of a water kite that is adapted to be secured to a fishing or mooring line and that maintains a fishing hook connected therewith in a desired position in a stream relative to the fisherman, or in a body of water relative to a trolling boat.

Another object of the invention is the provision of a fishing kite that has a hook connected therewith, and which kite will automatically become inoperative once a fish has been caught on the hook so that the fisherman may "play" the fish without objectionable interference from the kite.

A still further object of the invention is the provision of a fishing kite having a hook connected therewith, and which kite is provided with means that is adapted to not only render the kite inoperative after a fish has been caught on the hook, but which kite is provided with means that will automatically "set" the hook in the mouth of a fish upon the latter pulling on the hook.

An added object is the provision of a fishing kite having means for adjusting its action in the water so as to control its movement or position relative to the fisherman; and another object is the provision of a fishing kite that is adapted to be rendered inoperative upon a fish being caught, and which kite and fish will be readily retrieved after the fish has been hooked.

Other objects and advantages will appear in the description and in the drawings.

Fig. 1 is an isometric view of the kite in an operative position.

Fig. 2 is a fragmentary view of the rear end of the kite of Fig. 1 showing the action of the kite release structure in setting the hook in the mouth of a fish, the head of the fish being indicated in dot-dash line.

Fig. 3 is a view similar to that of Fig. 1 showing the kite fins collapsed and the hook released from its position shown in Fig. 1.

Fig. 4 is a view illustrating the action of the kite in a stream.

Fig. 5 is a fragmentary view of the rear end of a kite that shows a slightly different arrangement for the hook-line than is shown in Fig. 1.

Fig. 6 is an isometric view showing a modification of the kite of Fig. 1 with respect to the hook actuated means.

Fig. 7 is an end view of the kite of Fig. 6 omitting the hook and the element connected directly with the hook-line.

Fig. 8 is a perspective view of a kite of a somewhat different form from that shown in Figs. 1 and 6.

In detail, referring to Fig. 1 the main body of the kite illustrated in said figure is a substantially oblong flat sheet 1 that may be made of a suitable plastic material or any other suitable material.

At one end of said sheet 1 and at one side of the latter are a pair of spaced flat vanes or fins 2, 3. These are preferably elongated and extend generally longitudinally of the sheet 1 but also slightly convergently in direction away from the end or leading edge 4 of sheet 1, which edge will hereafter be called the "leading edge" since it is the edge that is leading or that heads upstream when the kite is in the water, as will appear later on.

The normal position of the sheet 1 when in the water is in a generally vertical plane, but the longitudinal axis of the sheet extends generally horizontally. In the description the "upper" and "lower" edges are used to describe the longitudinally extending edges of the device when it is normally in the water and in use before a fish has been hooked.

The vane 2 is the upper vane of the two and projects laterally from the one side of the body 1. The shape may vary, but a simple and effective shape is illustrated, in which its longitudinally extending edges are straight and substantially parallel. One of said edges is against the said one side of the vane 2. The rear edge or the end edge nearest the trailing edge of the vane 2 may extend normal to the longitudinally extending edges, while the leading edge preferably extends obliquely forwardly from the leading edge 4 of vane 2 so that a pointed leading end portion 5 on vane 2 projects forwardly beyond the leading edge 4 of the body 1.

Vane 3 is not as wide as vane 2, but it is also formed with a pointed leading end portion 6 that is similar to the pointed end portion 5 of vane 2. Vanes 2, 3 may be of approximately the same length, although vane 3 is usually shorter and may be positioned so that the terminating point of portion 6 is spaced from the edge 4 of body 1 about the same distance as the leading point of portion 5 on vane 2.

Vane 2 is adjacent to the upper edge of the body 1 and vane 3 is adjacent to the lower edge. Both are swingably connected to the body 1 for swinging oppositely outwardly relative to each other about their respective longitudinally extending edges that are substantially against the one side of body 1. However, they are restricted to swinging between positions in which they are substantially coplanar and against body 1 at their marginal portions that are along their inner edges, and positions extending substantially at right angles to said body.

The means for so mounting vane 2 may comprise a cord 7 that extends along and substantially in engagement with the side of vane 2 that is opposed to vane 3 when said vanes are in approximately opposed relation as seen in Fig. 1. This cord extends along the marginal portion of the vane that is adjacent to body 1, and extends through openings 8, 9 in the ends of the vane and then through openings 10, 11 formed in body 1 that are substantially even with openings 8, 9 respectively. The cord then extends at 12 along the side of body 1 that is opposite to vane 3, and between openings 10, 11. Thus cord 7 is virtually an endless cord and it is sufficiently taut to prevent swinging of the vane toward vane 3 past a portion disposed normal to the body 1, while permitting the vane to move away from vane 3 to a collapsed position as seen in Fig. 3 in which it is flat against body 1 along the marginal portion of the vane that is nearest to the body 1.

The vane 3 has the same structure for swingably securing it to body 1, a cord 13 extending along the inner side of the vane 3 along the marginal portion of the latter that is nearest to the body 1, and then through openings 14, 15 and from said openings through openings formed in body 1 adjacent thereto and along the side of body 1 opposite to vane 3 in exactly the same manner as has been described for vane 2.

Openings 16, 17 respectively adjacent to the openings 9, 15 but formed in body 1 may be provided to enable adjusting the rear or trailing ends of the vanes relative to each other for modifying the action of the kite in the water according to circumstances of the current and the desires of the fisherman, as will later be explained. In other words the vanes 2, 3 may be swingably connected to the body 1 in a more or less degree of convergence from their leading to their trailing ends, or one or the other of the vanes may be positioned to extend more or less nearly parallel with the longitudinal axis of the body 1 as desired.

The rear or trailing end of body 1 is formed with an opening 20 along a line centrally between the longitudinally extending edges of the body 1. The trailing edge of said body 1 is preferably recessed or cut away between rearwardly projecting end portions 21 that are at the trailing ends of the longitudinally extending edges of the body 1.

An element, generally designated 22 and formed of wire or of any other suitable material is adapted to be positioned at the trailing end of the body 1. This element 22 comprises an elongated substantially straight central bar 23 of a length equal to approximately the distance between the rear end projections 21 of body 1. A pair of corresponding, relatively short legs 24 are rigid with the ends of bar 23 and project approximately at right angles thereto at the same side of the bar. Eyes 25 are formed in the outer ends of legs 24.

An apertured lug 26 is rigid with the bar 23 at a point centrally between the ends of said bar, which lug projects to the side of bar 23 opposite to the side from which the legs 24 project.

Bar 23 is adapted to be positioned at the side of the body 1 that is opposite to the vanes 2, 3 and in a position against said body and extending at right angles to the longitudinal axis of the body 1 with lug 2 extending through the opening 20 in body 1.

A straight pin 27 at the same side of body 1 as vanes 2, 3 is adapted to extend through the aperture in lug 26, and to be flat against the body in a position extending parallel with the longitudinal axis of the body 1. Lug 26 preferably has rounded inner surfaces defining the sides of the aperture therein, and the aperture is preferably larger than the diameter of the pin, with the latter being cylindrical, so that the pin will not be objectionably bound in the aperture but can be readily pulled out of the latter except for the frictional resistance between the rounded inner sides of the aperture at one point therearound and the cylindrical sides of the pin.

Pin 27 has an eye 28 at its rear end where it is in operative position extending through the aperture in lug 26 as seen in Fig. 1. A leader or hook-line 29 of any desired and suitable length connects the eye 28 with fishing hook 30.

A bridle generally designated 32 comprises a pair of leading lines 33 respectively connected with the cords 7, 13 at the points when the cords pass from the forward openings 8, 14 in vanes 2, 3 to the openings in body 1 adjacent thereto, hence these lines 32 are adapted to extend across the oppositely outwardly facing sides of vanes 2, 3 near their forward or leading ends. Lines 33 of the bridle 32 extend convergently away from body 1 to a meeting point 34.

A pair of trailing lines 35 similar to lines 33 extend from point 34, where they connect with lines 33, to the eyes 25 on the outer ends of the legs 24 or bar 23, and they are secured to said eyes.

An endless conventional rubber band 36 may extend through one of the eyes 25 at one end of element 22 and be looped through itself outside the eye for securement to said eye to provide a major loop extending away from the eye. This major loop extends, under tension, between vanes 2, 3 and around a leading portion 37 of the body that is disposed between a pair of notches 38 formed in said leading edge, the said band being positioned in said notches.

A second rubber band 39 is similarly secured to the other eye 25 at the other end of element 22 and it also extends under tension, between the vanes 2, 3 and around the leading portion 37 between notches 38.

These bands 36, 39 extend across the rear or trailing edge of the body 1 between and adjacent to the rear projections or end portions 21 of body 1.

A short line 40 connects eye 28 of pin 27 with one of the eyes 25 on element 22, and the conventional fishing line 41 is connected with the bridle at point 34.

In operation, the fishing kite with the pin 27 holding element 22 in position against the rear end of the body 1, and with vanes 2, 3 held against collapse by the leading lines 33 of the bridle, is launched or positioned within a flowing stream with the leading end headed upstream. As line 41 is let out the kite will move out in the stream, and the leading edge will be maintained in a position facing upstream as seen in Fig. 4. The kite will remain at the surface of the stream due to the larger area of vane 2 tending to hold it up and the smaller area of vane 3 will steady the kite at the surface by tending to move the kite down. The convergent opposed surfaces of the vanes will keep the leading edge of the kite headed upstream. The hook 30 will be in trailing position. Thus, instead of the usual experience (in the absence of the kite) of the hook being carried downstream and against the bank on which the fisherman is located, and also sinking in the water, the hook will be kept at the desired level (which may vary with the length of the hook line 29) and at all times it will be maintained in the current and at any desired position within said current.

Upon a fish taking the hook and pulling on the same, the pin 27 will be pulled out of the aperture in lug 26 and instantly the bands 36 will collapse to jerk the element 22 and hook 30 forwardly to thereby set the hook in the mouth of the fish (Fig. 2).

Since release of element 22 also results in the trailing lines 35 of the bridle being disconnected from the trailing end of the body 1, the leading lines 33 will slide off the forward or leading ends of the vanes 2, 3 and they will collapse to the coplanar position shown in Fig. 3 so as to render the kite inoperative and to enable the fisherman to "play" the fish free from any objectionable interference by the kite. The kite and the hook will be reeled in at the same time, and after the fish has been landed, the kite can be reset and re-launched.

Referring to Fig. 5 the structure in this example is identical to the structure of the device shown in Fig. 1 except that the line 40 connecting the hook with the element 22 is not used. Instead, a line 42 separate from line 41 leads from the hook through eye 28 in pin 27 to the fisherman. By this structure the kite may be held by the fisherman by line 41, or the latter may be moored to some object on the shore, and line 42 can then be manipulated by the fisherman so as to move the hook and any bait or lures back and forth relative to the kite, since die line 42 is slidable through eye 25. As soon as a fish strikes the bait or lure and jerks the line, the pin 27 will be pulled from the kite and the fish can then be "played" independently of the kite. The pin 27 would be all that would remain on line 42.

The device shown in Figs. 6, 7 is the same as the one shown in Fig. 1 except that a different means is employed for releasing the trailing lines of the bridle than the pin 27 and element 22.

The same numbers will apply to the parts that are the same as those shown in Fig. 1.

Instead of the element 22 and pin 27, an element 43 is provided in Fig. 6, which element comprises a bar 44 connected at its ends by corresponding laterally projecting legs 45 with the outer ends of one of the arms 47 of a similar pair of generally U-shaped members 48.

These U-shaped members at the ends of bar 44 receive the trailing edge of the body 1 between the arms 47 of the U-members 48 and the other arms 49 of said U-members. Said arms 49 and bar 44 are at the side of the body 1 that is opposite to the vanes 2, 3 and arms 49 are at the same side of the body 1 as said vanes.

The lower one of arms 47 has a longitudinal extension 50 thereon which extension may have a pair of eyes 51 spaced therealong. A hook line 52 is connected at one end with one of the eyes 51, and has the hook 53 connected with the other end.

The trailing lines 35 are connected with eyes 54 that are on the ends of arms 49, and bands 36, 39 are connected with eyes 54.

Other than for the above differences the structure is the same as in Fig. 1, it being noted that the end U-members 48 are disposed between the rear end projections 21 of body 1.

In operation a pull of the fish on the hook results in a pull on extension 50. This extension projects angularly outwardly relative to the body 1, hence functions as a lever arm for pulling the U-members around the trailing edge of body 1 so that the bands 36, 39 will quickly jerk the element 43 off the trailing edge and forwardly when sufficient pull has been transmitted to the extension 50. The degree of pull necessary can be modified by attaching the hook line 52 to an eye 51 of the extension 50 that is nearer to the U-element connected therewith, or farther from said element, as desired.

Once the element 43 is released from the trailing edge, the vanes 2, 3 will collapse and will no longer function to maintain the kite at any particular position in the stream.

Fig. 8 shows a kite that comprises a body 56 of sheet material, having a buoyant float 57 secured thereto along its upper edge for supporting the kite at the water level.

The hook 58 in this case is connected by a line 59 with one arm 60 of a U-shaped element generally designated 61.

The rear edge of body 56 is formed with a notch 62 centrally between its ends and the U-member 61 is positioned in said notch with the arm 60 positioned at one side of the body 56 and the other arm 63 at the other side. The arm 63 has an eye 64 at its outer end and an endless rubber band 65 is connected with said eye in the same manner as band 36 is connected with eye 25 in Fig. 1. This band extends from the eye 64 under tension around a portion 66 between notches or grooves 67 in the leading edge of the body 56.

The arm 60 of element 61 also has an eye 68 at its outer end and the hook line 59 is connected with said eye.

The bridle has a pair of leading lines 69 that are connected with the body 56 adjacent to the leading corners of the latter, while a single trailing line 70 connects with eye 64. Lines 69, 70 extend convergently to a single point 71 for connection with the fishing line 72.

Upon a fish pulling on the hook 58 the arm 60 will be pulled rearwardly relative to the body 56 and band 65 will cause the element 61 to be released from notch 62 and to be jerked forward so as to set the hook in the mouth of the fish.

While the operation of the kite has been described with respect to a current of water, such as a flowing stream or river, it is clear that the kite would move to one or the other sides of the path of a boat when the boat is moved along said path in a body of relatively still water.

The leading lines 33 of the bridle are normally shorter than the trailing lines, and as this would have an effect upon the kite, it is optional with the user as to how much shorter the leading lines should be.

It is not intended that the detailed description shall constitute limitations on the invention as claimed, since the description is merely intended to clearly describe several examples of the invention.

I claim:

1. A fishing kite comprising: a main body of sheet material having a leading edge at one end thereof and a trailing edge at the opposite end respectively adapted to face upstream and downstream when said body is in a generally vertical plane in a current of water and has a bridle connecting it with a line, a flexible bridle for so connecting said body with a line, said bridle being at one side of said body and having a leading portion thereof connected with said body adjacent to said leading edge and also having a trailing portion, an element connected with said trailing portion and releasably connected with said body at its trailing edge, a fishing hook having a line connected therewith, a member in engagement with said element and connected with said line, said member being actuatable for movement upon the pull of a fish on said hook being transmitted by said line to said member for releasing said element from said body, means carried by said body for maintaining the latter substantially at the surface of the water when said element is connected with said body at the trailing edge of the latter and when a held line is connected with said bridle, yieldable means yieldably holding said element under tension in engagement with said body adjacent to the trailing edge of the latter, said yieldable means being connected with said body and with said element and operatively associated with said member for releasing said element upon said actuation of said member whereby said element and said hook and the line connected therewith will be released from said body upon said member being pulled by a fish on said hook.

2. A fishing kite comprising: a main body of sheet material having a leading edge at one end thereof and a trailing edge at the opposite end respectively adapted to face upstream and downstream when said body is in a generally vertical plane in a current of water and has a bridle connecting it with a line, a flexible bridle for so connecting said body with a line, said bridle being at one side of said body and having a leading portion thereof connected with said body adjacent to said leading edge and also having a trailing portion, an element connected with said trailing portion and releasably connected with said body at its trailing edge, a fishing hook having a line connected therewith, a member in engagement with said element and connected with said line, said member being actuatable for movement upon the pull of a fish on said hook being transmitted by said line to said member for releasing said element from said body, means carried by said body for maintaining the latter substantially at the surface of the water when said element is connected with said body at the trailing edge of the latter and when a held line is connected with said bridle, yieldable means yieldably holding said element under tension in engagement with said body adjacent to the trailing edge of the latter, said yieldable means being connected with said body and with said element and operatively associated with said member for releasing said element upon said actuation of said member whereby said element and said hook and the line connected therewith will be released from said body upon said member being pulled by a fish on said hook, said means for maintaining said body at the surface of the water comprising a pair of spaced elongated vanes at said one side of said body projecting therefrom and extending longitudinally convergently relative to each other from said leading edge toward said trailing edge.

3. A fishing kite comprising: a main body of sheet material having a leading edge at one end thereof and a trailing edge at the opposite end respectively adapted to face upstream and downstream when said body is in a generally vertical plane in a current of water and has a bridle connecting it with a line, a flexible bridle for so connecting said body with a line, said bridle being at one side of said body and having a leading portion thereof connected with said body adjacent to said leading edge and also having a trailing portion, an element connected with said trailing portion and releasably connected with said body at its trailing edge, a fishing hook having a line connected with said element, said element being actuatable for movement upon the pull of a fish on said hook being transmitted by said line to said element for releasing said element from said body, means carried by said body for maintaining the latter substantially at the surface of the water when said element is connected with said body at the trailing edge of the latter and when a held line is connected with said bridle, yieldable means yieldably holding said element under tension in engagement with said body adjacent to the trailing edge of the latter, said yieldable means being connected with said body and with said element and operable for releasing said element upon said actuation of said element whereby said element and said hook and the line connected therewith will be released from said body upon said element being pulled by a fish on said hook, said means for maintaining said body at the surface of the water comprising a buoyant float carried by said body at its upper edge when said body is in said generally vertical plane with its leading and trailing edges respectively facing upstream and downstream.

4. A fishing kite comprising: a main body of sheet material having a leading edge at one end thereof and a trailing edge at the opposite end respectively adapted to face upstream and downstream when said body is in a generally vertical plane in a current of water and has a bridle connecting it with a line, a flexible bridle for so connecting said body with a line, said bridle being at one side of said body and having a leading portion thereof connected with said body adjacent to said leading edge and also having a trailing portion, an element connected with said trailing portion and releasably connected with said body at its trailing edge, a fishing hook having a line connected therewith, a member in engagement with said element and connected with said line, said member being actuatable for movement upon the pulll of a fish on said hook being transmitted by said line to said member for releasing said element from said body, means carried by said body for maintaining the latter substantially at the surface of the water when said element is connected with said body at the trailing edge of the latter and when a held line is connected with said bridle, yieldable means yieldably holding said element under tension in engagement with said body adjacent to the trailing edge of the latter, said yieldable means being connected with said body and with said element and operatively associated with said member for releasing said element upon said actuation of said member whereby said element and said hook and the line connected therewith will be released from said body upon said member being pulled by a fish on said hook, said leading portion of said bridle being a pair of flexible lines and said trailing part also being a pair of flexible lines, the lines of said pairs being joined at one of their ends for connection with a line, and the other ends of the lines of said pairs being spaced apart where they connect with the leading end of said body and with said element respectively.

5. A fishing kite comprising: a main body of sheet material having a leading edge at one end and a trailing edge at the opposite end respectively adapted to face upstream and downstream when said body is in a generally vertical plane within a flowing stream or the like, a flexible bridle at one side of said body having a leading portion thereof connected with said body adjacent to its leading edge and having a trailing portion, an element connected with said trailing portion and releasably held on said body at its trailing edge, a fishing hook and a line connected therewith, a movable member connecting said line with said element actuatable upon the pull of a fish on said hook and said line for releasing said element from said body, spaced control fins carried by said body for movement from an extended position projecting from said one side of said body and extending from said leading edge convergently toward said trailing edge, to a collapsed position in a plane generally parallel with the plane of said body, said portion of said bridle engaging said fins for holding them in said extended position when said element is connected with said body, said portion being releasable from holding said fins in said extended position upon actuation of said member for releasing said element from said body, means including a rubber band yieldably holding said element on said body, said band being under tension and actuatable upon actuation of said member for quickly releasing said element from said body and for jerking said element and the hook and line connected therewith toward said leading edge to thereby set said hook in the mouth of the fish that has effected the pull thereon.

6. A fishing kite comprising: a flat body of sheet material having a leading edge at one end and a trailing edge at the other end and supporting means carried by said body for maintaining the latter generally vertical at the surface of a current of water with said leading edge facing upstream and with said trailing edge facing downstream, a flexible bridle at one side of said body including a leading portion and a trailing portion respectively connected with the leading and with the trailing ends of said body and said leading and trailing portions being joined at a point spaced from said one side of said body for connection with a held line, a member at the trailing end of said body, a hook, a hook line connecting said hook with said member, and releasable means yieldably and releasably held on said body for releasably holding said trailing portion at the trailing end of said body and for releasably holding said member at said trailing end of said body, and yieldable means connected with said body and with said releasable means for yieldably holding said releasable means on said body.

7. A fishing kite comprising: a flat body of sheet material having a leading edge at one end and a trailing edge at the other end and supporting means carried by said body for maintaining the latter generally vertical at the surface of a current of water with said leading edge facing upstream and with said trailing edge facing downstream, a flexible bridle at one side of said body including a leading portion and a trailing portion respectively connected with the leading and with the trailing ends of said body and said leading and trailing portions being joined at a point spaced from said one side of said body for connection with a held line, a member at the trailing end of the latter, a hook, a hook line connecting said hook with said member, and releasable means yieldably and releasably held on said body for releasably holding said trailing portion at the trailing end of said body and for releasably holding said member at said trailing end of said body, and yieldable means connected with said body and with said releasable means for yieldably holding said releasable means on said body, said member being operatively connected with said releasable means for effecting actuation of said yieldable means to release said releasable means from said body upon said member and hook line being pulled by the pull of a fish on said hook.

8. A fishing kite comprising: a flat, elongated, generally rectangular body of sheet material having a leading edge at one end thereof and a trailing edge at the opposite end respectively adapted to face generally upstream and downstream when said body is in a current of water and has a bridle connecting it with a held line; a bridle comprising a pair of leading lines and a pair of trailing lines extending divergently from one point with said pair of leading lines being connected with said body adjacent to the ends of said leading edge and with said pair of trailing lines extending toward the ends of said trailing edge; an element separable from said body adjacent to said trailing edge, the divergent ends of said trailing lines being connected with said element at points adjacent to the ends of said trailing edge, a hook, a hook line connected therewith and a member connected with said hook line, means including a rubber band connected with said body releasably holding said element and said member to said body adjacent to the trailing end of the latter, said member being actuatable under a pull on said hook line from the pull of a fish on said hook for releasing said element from said body, means connecting said member with said element for movement of said member with said element under the influence of said rubber band upon said element being released from said body.

No references cited.